(12) United States Patent
Hirai

(10) Patent No.: US 7,751,912 B2
(45) Date of Patent: Jul. 6, 2010

(54) REPLAY APPARATUS AND CONTENT EVALUATION METHOD

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 1225 days.

(21) Appl. No.: 11/017,938

(22) Filed: Dec. 22, 2004

(65) Prior Publication Data

US 2005/0163481 A1  Jul. 28, 2005

(30) Foreign Application Priority Data

Dec. 26, 2003 (JP) ............... 2003-434715

(51) Int. Cl.
*G06F 17/00* (2006.01)
(52) U.S. Cl. ...................................... 700/94
(58) Field of Classification Search ................ 700/94; 707/104.1, 1, 203, 10, 102
See application file for complete search history.

(56) References Cited

U.S. PATENT DOCUMENTS 6,438,579 B1 * 8/2002 Hosken ..................... 709/203

2002/0002899 A1 * 1/2002 Gjerdingen et al. ........... 84/667
2003/0089218 A1 * 5/2003 Gang et al. .................. 84/615
2003/0236582 A1 * 12/2003 Zamir et al. .................. 700/94

FOREIGN PATENT DOCUMENTS

| JP | 4-221489 | 8/1992 |
| JP | 2002-150664 | 5/2002 |
| JP | 2003-068060 | 3/2003 |
| JP | 2003-317451 | 11/2003 |

* cited by examiner

*Primary Examiner*—Andrew C Flanders
(74) *Attorney, Agent, or Firm*—Oblon, Spivak, McClelland, Maier & Neustadt, L.L.P.

(57) ABSTRACT

There is provided a replay apparatus including a skip function, which is initiated if a skip button is pressed, for stopping a replay operation to restart at the next content after skipping during the replay operation of one of a plurality of stored contents. The replay apparatus includes measuring means for measuring an elapsed time from a replay start time of a content and a time when the content is skipped, evaluating means for giving an evaluation value reflecting a preference of a user to the replayed content that is skipping based on the elapsed time, and creating means for creating preference information by registering the given evaluation value in association with the replayed content.

22 Claims, 6 Drawing Sheets

F I G. 6

| OPERATION | ELAPSED TIME | DEGREE OF PREFERENCE | |
|---|---|---|---|
| SKIP AFTER STARTING REPLAY | WITHIN 2 SECS | 0 | CASE WHERE USER WANTS TO SKIP WITHOUT EVALUATION |
| | T SECS. WITHIN 5 SECS. | -20/T | CASE WHERE USER FINDS TUNE UNMATCHED WITH PREFERENCE AT ONCE |
| | T SECS. WITHIN 20 SECS. | -20/T | CASE WHERE USER FINDS TUNE UNMATCHED WITH PREFERENCE AFTER LISTENING FOR A WHILE |
| | T SECS. WITHIN 1 MIN. | -20/T | CASE WHERE USER JUDGES TUNE TO BE UNMATCHED WITH PREFERENCE ALTHOUGH JUDGMENT IS DIFFICULT |
| NO REPLAY | | 0 | STATUS SUCH THAT JUDGMENT OF USER HAS NOT BEEN OBTAINED |
| REPLAY WITHOUT SKIP | | +2 | TUNE IS JUDGED TO HAVE BEEN LISTENED ENJOYABLY |
| SKIP BEFORE STARTING REPLAY | | 0 | STATUS SUCH THAT USER IS SEARCHING FOR OBJECTIVE TUNE WHILE VIEWING TITLES |
| REPLAY AFTER RETURN SKIP | | +3 | USER RETUNES AND REPLAYS AGAIN IN ORDER TO LISTEN TO CONTENT OF TUNE IN DETAIL |
| REPLAY CONSECUTIVELY 3 TIMES OR MORE | | +4 | STATUS SUCH THAT USER PARTICULARLY LIKES TUNE AND WANTS TO REPEAT LISTENING |
| REPLAY BY SPECIFYING TITLE | | +2 | USER REPLAYS WITH INTENTION |
| REPEAT REPLAY | NOT LESS THAN 30 TIMES/WEEK | -1 | STATUS SUCH THAT FREQUENCY IS HIGH AND USER GROWS TIRED |

PREFERENCE INFORMATION REGISTER AREA

| TITLE | EVALUATION VALUE |
|-------|------------------|
| aa    | 0                |
| bb    | -5               |
| cc    | -2               |
| dd    | -0.5             |

F I G. 9

| OPERATION | ELAPSED TIME | DEGREE OF PREFERENCE | |
|---|---|---|---|
| SKIP AFTER STARTING REPLAY | WITHIN 2 SECS | 0 | CASE WHERE USER WANTS TO SKIP WITHOUT EVALUATION |
| | T SECS. WITHIN 5 SECS. | -20/T | CASE WHERE USER FINDS TUNE UNMATCHED WITH PREFERENCE AT ONCE |
| | T SECS. WITHIN 20 SECS. | -20/T | CASE WHERE USER FINDS TUNE UNMATCHED WITH PREFERENCE AFTER LISTENING FOR A WHILE |
| | T SECS. WITHIN 1 MIN. | -20/T | CASE WHERE USER JUDGES TUNE TO BE UNMATCHED WITH PREFERENCE ALTHOUGH JUDGMENT IS DIFFICULT |
| NO REPLAY | | 0 | STATUS SUCH THAT JUDGMENT OF USER HAS NOT BEEN OBTAINED |
| REPLAY WITHOUT SKIP | | +2 | TUNE IS JUDGED TO HAVE BEEN LISTENED ENJOYABLY |
| SKIP BEFORE STARTING REPLAY | | 0 | STATUS SUCH THAT USER IS SEARCHING FOR OBJECTIVE TUNE WHILE VIEWING TITLES |
| REPLAY AFTER RETURN SKIP | | +3 | USER RETUNES AND REPLAYS AGAIN IN ORDER TO LISTEN TO CONTENT OF TUNE IN DETAIL |
| REPLAY CONSECUTIVELY 3 TIMES OR MORE | | +4 | STATUS SUCH THAT USER PARTICULARLY LIKES TUNE AND WANTS TO REPEAT LISTENING |
| REPLAY BY SPECIFYING TITLE | | +2 | USER REPLAYS WITH INTENTION |
| REPEAT REPLAY | NOT LESS THAN 30 TIMES/WEEK | -1 | STATUS SUCH THAT FREQUENCY IS HIGH AND USER GROWS TIRED |
| ACQUISITION HISTORY | AT INITIAL REPRODUCTION TIME | +2 | IT IS ASSUMED THAT USER HAS SELECTED TUNE BECAUSE IT IS MATCHED WITH PREFERENCE |
| ELAPSED TIME AFTER INITIAL REPLAY | ONE WEEK ELAPSED | -1 | |
| | ONE MONTH ELAPSED | -2 | STATUS SUCH THAT FRESH INTEREST HAS DECLINED |
| EVALUATION MODE PLUS BUTTON | T SECS. WITHIN 2 SECS. | 10 | CASE WHERE USER FINDS TUNE MATCHED WITH PREFERENCE AT ONCE |
| | T SECS. WITHIN 5 SECS. | 20/T | CASE WHERE USER FINDS TUNE MATCHED WITH PREFERENCE AT ONCE |
| | T SECS. WITHIN 30 SECS. | 20/T | CASE WHERE USER FINDS TUNE MATCHED WITH PREFERENCE AFTER LISTENING FOR A WHILE |
| EVALUATION MODE MINUS BUTTON | T SECS. WITHIN 2 SECS. | -10 | CASE WHERE USER FINDS TUNE UNMATCHED WITH PREFERENCE AT ONCE |
| | T SECS. WITHIN 5 SECS. | -20/T | CASE WHERE USER FINDS TUNE UNMATCHED WITH PREFERENCE AT ONCE |
| | T SECS. WITHIN 30 SECS. | -20/T | CASE WHERE USER FINDS TUNE UNMATCHED WITH PREFERENCE AFTER LISTENING FOR A WHILE |

REPLAY APPARATUS AND CONTENT EVALUATION METHOD

The present invention claims priority to its priority document No. 2003-434715 filed in the Japanese Patent Office on Dec. 26, 2003, the entire contents of which being incorporated by reference herein.

BACKGROUND OF THE INVENTION

1. Field of the Invention

The present invention relates to a replay apparatus that replays arbitrary content of a plurality of stored contents, and particularly to a content evaluation method for evaluating a replayed content based on preference of a user.

2. Description of Related Art

In recent years, an increase in capacity of a hard disk drive and advance of compression technique have allowed even portable equipment to record music information of several thousands of tunes. Therefore, by selecting a tune matched with preference of a user in advance, a tune reflecting the preference of the user can be automatically selected and played based on this preference information.

For acquisition of this preference information, an evaluation value manually inputted by a user, the number of replays and owned tunes are used. For example, (1) there is a replay apparatus in which operation information of a plurality of users when dynamic data such as music is replayed by the replay apparatus is collected and processed in an integrated fashion on a predetermined server, and added value information is created based on a result obtained by statistically processing the reaction of each user to the dynamic data. In this case, the preference information can be acquired from the above-mentioned added value information (refer to Patent Document 1, for example).

(2) There is a replay apparatus in which an operation content relating to the operation, an operation time when the operation is executed, and information of an operation object are acquired and stored, and the operation content with respect to the content is used as a viewing and listening history, when it is judged whether or not a predetermined operation is executed and the predetermined operation is judged to have been executed. In this case, the preference information can also be acquired from the operation content with respect to the content (refer to Patent Document 2, for example).

(Patent Document 1) Japanese Published Unexamined Application No. 2003-37856 (pages 7 and 8, FIG. 9)

(Patent Document 2) Japanese Published Unexamined Application No. 2002-232823 (pages 10, FIG. 1)

SUMMARY OF THE INVENTION

However, when the number of tunes stored in the replay apparatus is enormous, labor of selecting a tune matched with preference of the user is also enormous. For example, in the case where the preference information is obtained by the user's evaluation of each tune (inputting an evaluation value on a scale of five levels), a considerable amount of labor is required. This actual procedure for the user to evaluate a tune is such that during replaying the tune, a button is pressed twice, that a disk-shaped pad is rubbed with a finger, and that the finger is taken off at a position of a relevant score, and thus any tune takes about five seconds or more. Although the number of replays may obviously be used as an evaluation value and this method is advantageous for a tune replayed luckily, there are many tunes that are not replayed and buried. This method ends up with failure in the selection, so that the preference information is hard to be obtained or even if it is obtained, its reliability may be low.

Furthermore, in the publicly known method (1), although the acquisition of the reaction of the user from the user operation information is described, a concrete evaluation method for evaluating a degree of the preference of the user with respect to the replayed tune by evaluating the reaction of the user is not described, so that it is difficult to be appropriately determined which of a huge number of tunes should be preferentially selected to be replayed. In the method (2), although the information of the number of replays and the information as to whether or not the respective operations have been performed are significant, their concrete evaluation methods are not described, either, so that the detailed information is insufficient. For example, it has an issue that in the case where a tune to be deleted is automatically selected from the several thousands of tunes according to the preference, many tunes are ranked in the same place and thus the selection of the tune lacks rationality.

The present invention is made in view of the above-mentioned situation. It is desirable to provide a content evaluation method capable of evaluating a preference of a user with respect to a replayed content on a scale of a plurality of levels rationally and precisely without imposing a burden on the user, and to provide a replay apparatus in which by using this content evaluation method, a tune reflecting preference of the user may be appropriately selected to automatically replay in sequence, and the order of delete priority in the recorded tunes may be determined precisely and at the same time the recorded tune may be reevaluated to revise preference of the user on tunes.

According to an embodiment of the present invention, there is provided a replay apparatus having a skip function that stops the replay and restarts at the next content after skipping when pressing a skip button during replay of one of a plurality of stored contents. The replay apparatus includes measuring means for measuring an elapsed time from a replay start time of the content to a time when the content is skipped, evaluating means for giving an evaluation value reflecting preference of a user to the replayed content before skip based on the elapsed time, and creating means for creating preference information by registering the given evaluation value in association with the replayed content.

Furthermore, according to another embodiment of the present invention, there is provided a replay apparatus that replays a content selected from a plurality of stored contents. The replay apparatus includes acquiring means for acquiring operation information for replaying the content and a replay status, evaluating means for giving an evaluation value reflecting preference of a user to the replayed content based on the acquired operation information and the replay status, and creating means for creating preference information by registering the given evaluation value in association with the replayed content.

Furthermore, according to another embodiment of the present invention, there is provided a content evaluation method for evaluating preference of a user with respect to a replayed content. The evaluation method includes a step of measuring an elapsed time between times when a plurality of operations involved with replay operation of the content are performed respectively, and a step of giving an evaluation value indicating a degree of preference of the user to the replayed content based on the measured elapsed time.

Thus, in the embodiment of the present invention, the elapsed time from the replay start time of a content to the time when the content is skipped is measured, and based on this measured elapsed time, the evaluation value reflecting preference of the user is given to the replayed content before skipping. If the replayed content is less matched with the preference, the user tends to skip the replay to another content sooner. Accordingly, as the elapsed time is smaller, a lower degree of evaluation in preference is given in a step-wise manner according to the elapsed time. Alternatively, an evaluation value indicating that the degree of the preference is high is given to a content that is replayed to the end once and then consecutively replayed again. In the case where replay frequency of the content exceeds a threshold value, assuming that the user grows tired of the content, an evaluation value indicating that the degree of the preference of the content is low is given, in the case where a newly stored content is replayed first, an evaluation value indicating that the degree of the preference is high is given to the content, and an evaluation value indicating that the degree of the preference is low is given to the content replayed after a set period has elapsed since the first replay. Thereby, according to the replay status of the content and a replay history of the content, without imposing a burden on the user, the preference of the user to the replayed content may be automatically evaluated rationally and precisely on a scale of a plurality of levels. Consequently, without imposing a burden to a user especially, the user's preference may be automatically figured out from a result of only performing replay operation. It is possible to automatically select the tune matched with the user's preference out of a large number of contents. Furthermore, the given evaluation value is registered in association with the replayed content to create the preference information and this information is placed in a play list to select and automatically replay the content matched with the preference, and at the same time, based on the preference information, the order of delete priority (from the content less matched with the preference) is automatically determined to thereby delete the stored content, which enables effective use of a storage apparatus. Furthermore, based on the preference information, the content unmatched with the preference is selected from the stored contents for the user to reevaluate, so that the buried tune matched with the preference may be revised and prevented from dead storage. Furthermore, a content matched with the preference analogized from the preference information is allowed to be automatically downloaded from a communication network, or be audio-recorded or video-recorded from broadcasting, so that the content matched with the preference is allowed to be stored without imposing a burden on the user.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIG. 6 is a table showing a block diagram of criteria for evaluating a replayed content by CPU shown in FIG. 1;

FIG. 9 is a table showing a block diagram of criteria for evaluating the replayed content by the CPU shown in FIG. 2.

DETAILED DESCRIPTION OF THE PREFERRED EMBODIMENTS

In order to evaluate a preference of a user with respect to a replayed content on a scale of a plurality of levels rationally and precisely without imposing a burden on the user an elapsed time between times when a plurality of operations involved with a replay operation of the content are measured respectively and giving an evaluation value indicating a degree of preference of the user to the replay content based on the measured elapsed time. Furthermore, to appropriately select a tune reflecting the preference of the user and automatically replay it in sequence, and to determine the order of delete priority in the recorded tunes precisely, and at the same time reevaluate the recorded tune so as to revise a favorite tune of the user again are accomplished by registering the given evaluation value in association with the replayed content to thereby create preference information, and selecting the content matched with the preference of the user based on this preference information or selecting the content unmatched with the preference.

Embodiment 1

Figure 1:
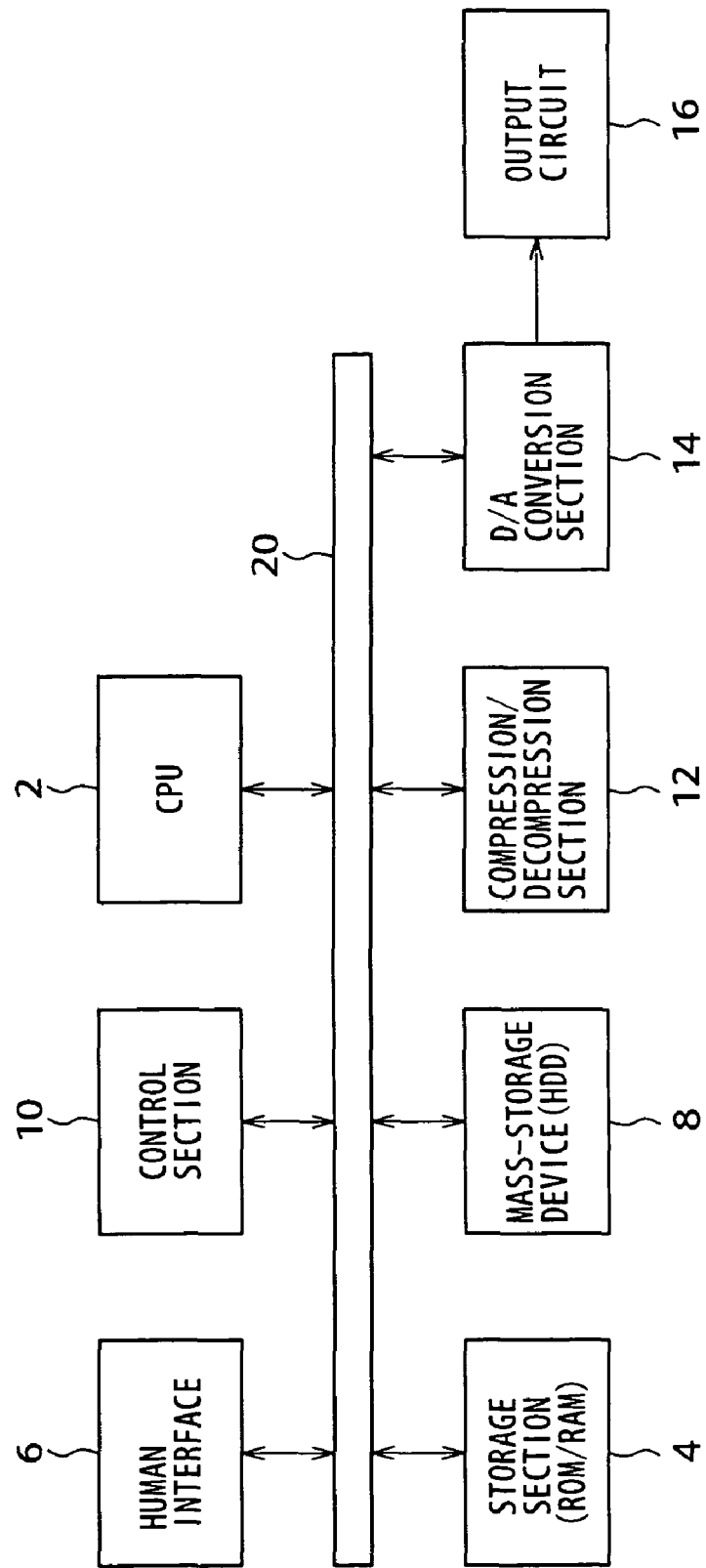
FIG. 1 is a block diagram showing a configuration of a replay apparatus according to an embodiment of the present invention.

FIG. 1 is a block diagram showing a configuration of a replay apparatus according to an embodiment of the present invention. The replay apparatus includes a CPU 2 which controls the entire replay apparatus or performs individual control including collecting the preference information of the user to prioritize the contents based on this preference information and deleting the recorded contents based on this order of priority, as to ring section 4 having RAM which provides a work area of the CPU 2 and ROM which stores a program controlling the CPU 2, a human interface 6 having an operation panel and a display section, a mass-storage device 8 such as a hard disk (HDD) storing a number of contents, a control section 10 performing replay or skip control of the contents stored in the mass-storage device 8 according to an instruction from the human interface 6, a compression and decompression section 12 performing compression and depression of audio data, a D/A conversion section 14 converting the audio digital data to an analogue signal, an output circuit 16 outputting the analogue signal (audio) subjected to power amplification or the like, and a bus line 20 connecting the above-mentioned components to each other.

Figure 2:
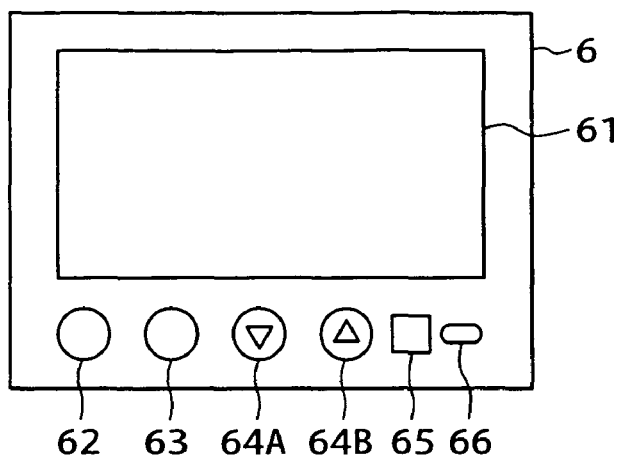
FIG. 2 is a view showing details of a human interface shown in FIG. 1.

FIG. 2 is a view showing the human interface 6 shown in FIG. 1. The human interface 6 has a display section 61 such as LCD, a replayed tune display/replay stop button 62, a replay button 63, a skip button (used as a content selection button as well) 64A, a return skip button (used as a return content selection button as well) 64B, reevaluation button 65, and an enter button 66.

Figure 3:
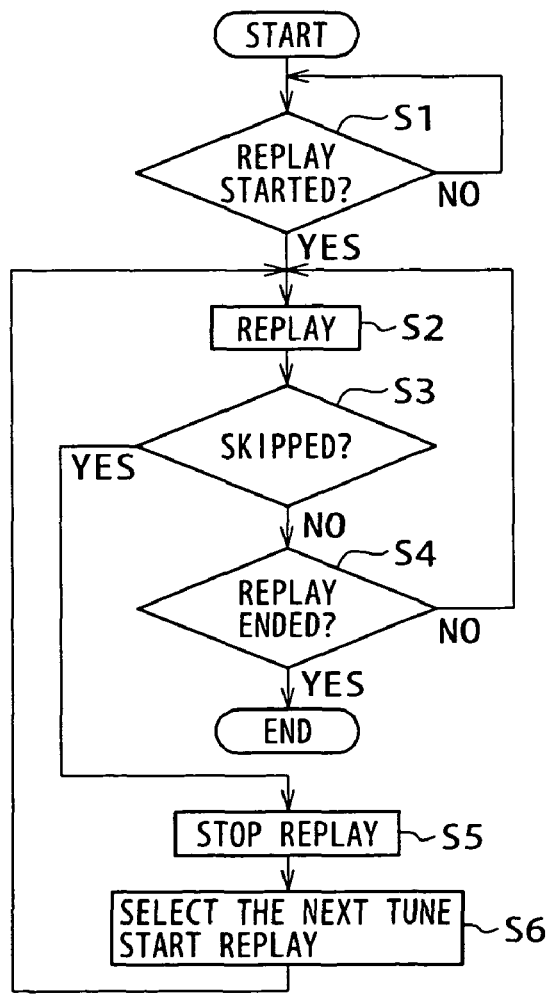
FIG. 3 is a flow chart showing a skip replay operation by the replay apparatus shown in FIG. 1.
Figure 4:
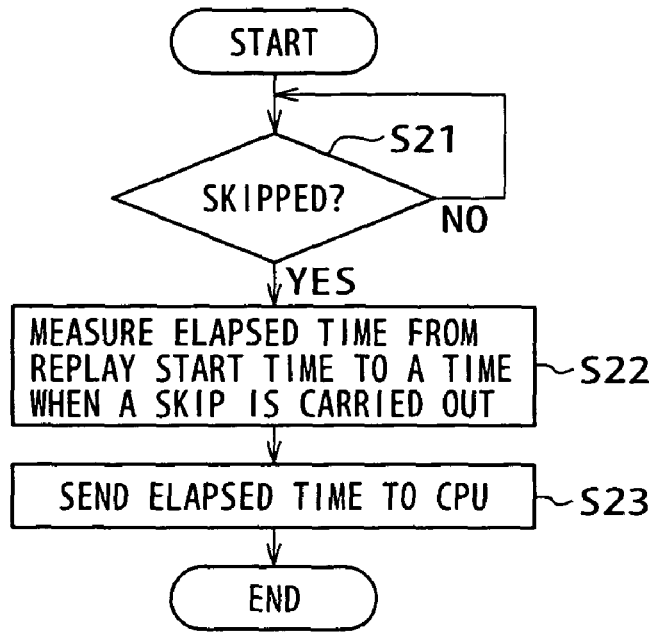
FIG. 4 is a flow chart showing a flow of operation to measure an elapsed time from starting replay to skipping by a control section shown in FIG. 1.
Figure 5:
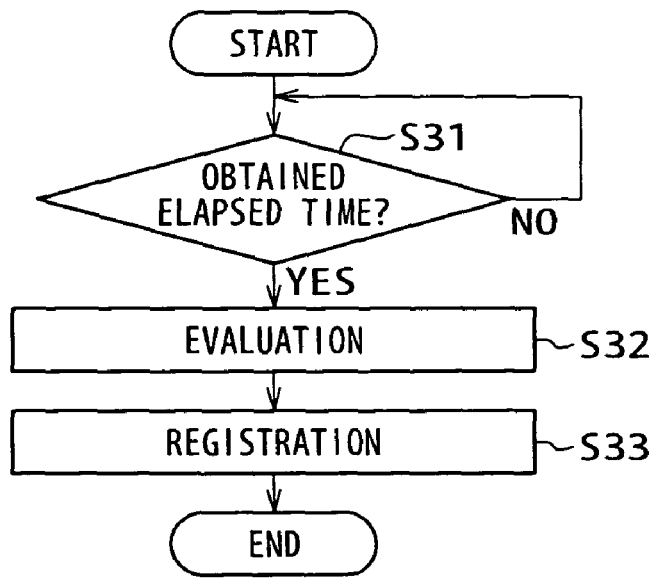
FIG. 5 is a flow chart showing an outline of evaluating operation of playing content by the CPU shown in FIG. 1.

Next, the operation of the present embodiment is described referring to the flowcharts of FIGS. 3 to 5. The replay apparatus shown in FIG. 1 is, for example, a music replay apparatus, and thus its content is hereinafter described as audio data.

At the time of normal replay, when a user presses the replayed tune display/replay stop button 62 of the human interface 6 to instruct replay start (Step 1), the control section 10 reads data such as titles of tunes, artists and composers of the stored audio data from the mass-storage device (hereinafter, referred to as HDD) 8 to display in the display section 61. The user operates the skip buttons 64A and 64B to select a tune which the user wants to replay, and then presses the replay button 63. Thereby, the control section 10 reads the audio data of the selected title from the HDD 8 and sends it to the compression and decompression section 12, and the audio data is expanded (decompressed) here and then is sent to the D/A conversion section 14. Since the D/A conversion section 14 converts the digital audio data to the analogue audio signal to output it to the output circuit 16, the output circuit 16 power-amplifies the analogue audio signal and outputs it to a speaker or headphone not shown in the figure (Step S2).

In the case where the user replays a tune but finds that the user does not want to listen to the tune to the last, the user presses the skip button 64A to skip the replay of the tune (Step S3). More specifically, when the skip button 64 is pressed, the control section 10 stops reading the audio data of the tune being replayed from the HDD 8 to stop replaying the tune (Step 5), and thereafter, a title displayed next to the title of the tune which has been replayed is selected and the audio data of this title is read from the HDD 8 and is sent to the compression and depression section 12 to start the replay (Step S6). The above-mentioned operations are repeated until one tune is judged to have been replayed and finished to the end at Step S4. The user repeats the replay of a tune and the skip for tune selection and when finding a tune that the user wants to listen to, the user listens to the tune to the last and then finishes the replay (Step S4).

When the above-mentioned skip replay is performed (Step S21), the control section 10 measures by a built-in timer a elapsed time from replay start of one tune until replay end by skip (a difference in time between a replay start time and a time when the skip is performed)(Step S22), and notifies this measured elapsed time together with the specific data of the replayed tune to the CPU 2 (Step S23). The difference in time between the replay start time and the time when the skip is performed is the same as a difference between a time when the skip operation is first performed and a time when the skip operation is next performed.

The CPU 2 evaluates the degree of the preference to the tune based on the replay time from the start of replay of this tune until skip, that is, the elapsed time between the time of the first skip and the time of the next skip.

This is a case where timing at which the skip button 64 is pressed is used as an evaluation value indicating the preference of the user to the tune. In the case of the content unmatched with the user's preference, the user listens to (watches) it a little and presses the button to skip to the next content, so that it may be assumed that the tune is less matched with the preference as the elapsed time from the start of replay until the skip button is pressed is smaller. The control section 10 ignores a silent part at the beginning of the replayed tune and sets the beginning time at when the music is actually started as the replay start time.

Figures 7, 8:
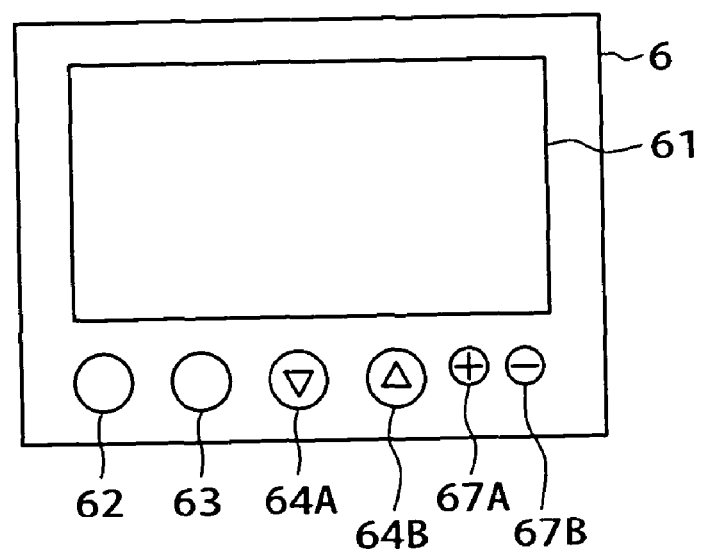
FIG. 7 is a schematic block diagram showing a structure of a reference information registration area set in a HDD shown in FIG. 1.
FIG. 8 is a view showing a configuration of a human interface of a replay apparatus according to another embodiment of the present invention.

The CPU 2, when acquiring the above-mentioned elapsed time between the skips (Step S31), gives an evaluation value to the skipped tune based on this elapsed time by using a block diagram as shown in FIG. 6 (Step S32), and this evaluation value is registered in association with the skipped tune in a preference information registration area as shown in FIG. 7 which is set in the HDD 8 (Step S33). Thereby, the preference information is created in the preference information registration area.

Although the skip in a normal replay mode ordinarily reflects factors of the preference, in some cases, it may not reflect the factors. There may be a case where although the user has an objective content, a different content happens to start and thus the user skips it. In consideration of such a case, for example, when the elapsed time is within two seconds, the operation of the skip is not evaluated and zero is registered as the evaluation value in the preference information registration area as shown in FIG. 7 set in the HDD 8.

In the case where the elapsed time is T seconds within five seconds, the CPU 2 assumes that the user judged the tune to be unmatched with the user's preference at once and registers $-20/T$ as the evaluation value of the skipped tune in the preference information registration area in association with the title of the skipped tune. In the case where the elapsed time is T seconds within 20 seconds, the CPU 2 assumes that the user judged this tune to be unmatched with the user's preference after listening for a while, and similarly registers $-20/T$ as the evaluation value. In the case where the elapsed time is T seconds within one minute, the CPU 2 assumes that the user judged the tune to be unmatched with the user's preference although the judgment is difficult, and registers $-20/T$ as the evaluation value in the preference information registration area. Accordingly, as the elapsed time becomes larger, an absolute value of the evaluation value becomes smaller, so that the evaluation value indicating that the tune is unmatched with the user's preference becomes lower. The skip before the start of replay is judged to indicate a state in which the user is searching for an objective tune while viewing the titles, and the evaluation value of zero is registered in the above-mentioned preference information registration area. Here, the CPU 2 performs cutoff or rounding off of a fractional part or quantization in division.

In addition to the method of evaluating the stored tune based on the above-mentioned elapsed time between the skips, the degree of the preference of the user to the operated tune may be evaluated from other operations of the user with respect to the human interface 6. As shown in FIG. 6, for example, a tune that is not replayed out of the tunes stored in the HDD 8 is judged to be in a state in which the judgment of the user has not been obtained and is registered with the evaluation value of zero. In the case where the user replays a tune and a tune ends without skipping, this tune is judged to have been listened to enjoyably and is registered with the evaluation value of +2. Furthermore, the skip before start of replay is judged to indicate a state in which the user is searching for an objective tune while viewing the tune titles and the evaluation value of 0 is registered. A tune replayed after return skip is judged to be a tune in which the user showed great interest because the user returned and replayed it again to listen to the content in detail, and is registered with the evaluation value of +3. A tune replayed consecutively three times or more is judged to be a tune that the user particularly likes and wants to listen to many times, and is registered with the evaluation value of +4. Furthermore, in the case where the user specifies the tune title to replay, this tune is replayed with intention, so that the tune is judged to be a favorite tune that the user wants to listen to and is registered with the evaluation value +2.

Next, in addition to the method of evaluating the replayed tune based on the above-mentioned operation of the user at the time of replay, a description of an evaluation method in which an elapsed time after a newly obtained tune is initially replayed is considered is given. First, after the tune is obtained and recorded in the HDD 8, at the time of initial replay, it is assumed that the user has selected the tune because it is matched with preference and the tune is registered with the evaluation value of +2. In the case where one week has elapsed without replay thereafter, this tune is judged to be somewhat unmatched with the preference, and the evaluation value is changed to −1, and in the case where one month has further elapsed, it is judged to be in a state in which fresh interest has declined, and the evaluation value is changed to −2.

Next, when, for example, the buttons 62 and 63 of the human interface 6 are pressed simultaneously to enter an automatic tune selection and replay mode, the CPU 2 refers to the preference information created in the preference information recording area as shown in FIG. 7 set in the HDD 8 to select a tune with a high evaluation and to place tune selection information on a list of the storage section 4. The control section 10 reads the audio data of the replayed tune from the HDD 8 in sequence while referring to this play list, and provides this to the compression and decompression section 12 to thereby automatically replay the selected tune in sequence. Since the replayed tune is a tune that the user prefers, the user is allowed to listen to the user's favorite tune easily without labor of selecting the tune to be replayed.

In the case where the tune is automatically evaluated as described above, there may be a content that has received a wrong evaluation because of instantaneous judgment. Even in the normal evaluation mode, if there are too many contents, the content with a high score obtained is evaluated preferentially, so that some contents may be buried in obscurity. Therefore, there is provided a function of performing reevaluation in order from the content with a lower score, excluding the contents with higher scores.

When the reevaluation button 65 is pressed to enter a dredging-up evaluation mode, the CPU 2 refers to the evaluation values corresponding to the tunes of the preference information created in the preference information recording area of the HDD 8, and selects the tunes with a lower evaluation value of zero or less to display in the display section 61 of the human interface 6. In this state, by operating the skip buttons 64A and 64B, a tune on the screen is selected and the replay button 63 is pressed to start the replay of the tune. When the user likes the tune, the user presses the enter button 66, so that the evaluation value with respect to this tune becomes +2, for example, which enables dredging-up. Thereafter, by operating the skip buttons 64A and 64B, the next tune is selected and the similar process is performed for evaluation, but in the case where the tune is judged to be not worth reevaluating, this tune is skipped to go to another tune.

Furthermore, in the present replay apparatus, based on the preference information, the order of delete priority is appropriately determined in order from the tune unmatched with the preference when the data in the HDD 8 is fully complied, by which the HDD 8 may be cleaned up with the necessary stored information matched with the preference left.

According to the present embodiment, in consideration of the replay skip operation of the user when replaying a tune and the elapsed time after initial replay of a newly obtained tune, the CPU 2 automatically performs the evaluation on a scale of a plurality of levels with respect to the stored tune in the HDD 8 to construct the preference information of the user, by which the degree of the preference of the user with respect to the tune may be evaluated on a scale of a plurality of levels precisely and thus high precision preference information reflecting the preference of the user with respect to the tune may be obtained.

Accordingly, by using the above-mentioned high precision preference information automatically constructed, a tune which is high in degree of the preference of the user is selected from the stored tunes at random and is automatically replayed, which allows the user to automatically replay the tune easily and enjoy it without suffering the inconvenience of selecting the tune that the user wants to listen to, from many stored tunes.

Furthermore, since the user may reevaluate a tune with lower evaluation manually to revise and listen to the buried tune, many tunes stored in the HDD 8 can be effectively used, so that dead storage may be eliminated.

Furthermore, based on the preference information, the order of delete priority may be approximately determined in order from the tune unmatched with the preference when the data is fully stored in the HDD 8, which can clean up the HDD 8 with the necessary stored information matched with the preference left. Accordingly, the capacity of the HDD 8 may be effectively used.

Furthermore, according to the present embodiment, the tune stored in the HDD 8 may be automatically evaluated in consideration of the replay skip operation of the user when the tune is replayed and the elapsed time after the initial replay of the newly obtained tune, so that in this case, the burden of the user imposed in evaluation may be reduced as compared with the foregoing case.

In the case of the content such as music, if a tune with a quick tempo and a slow ballad are evaluated with respect to the preference of the user in view of only timing, precision may be deteriorated. Accordingly, for the tune with a slow tempo, a correction coefficient is determined so as not to decrease the evaluation value even if the elapsed time is large. For example, since if the tempo is half, the evaluation takes double time, the evaluation value obtained by the above-mentioned method is rationally multiplied by a correction coefficient (2) to double the evaluation value.

When the preference of the user is evaluated, for digitalization in the case where the above-mentioned division is performed, a method may be selected in which a capacity of the memory to register the evaluation values in, the definition of the meaning of the evaluation value and the like are considered, for example, looking up a numeric table, determining a plurality of functions based on the elapsed time or the like.

Embodiment 2

FIG. 8 is a view showing a configuration of a human interface of a replay apparatus according to another embodiment of the present invention. However, since the configuration of the present embodiment is similar to the above-mentioned embodiment, a description of configuration and operation of each section having the same configuration is omitted and hereinafter, characteristic parts of the operation are described.

Although the configuration of the replay apparatus of the present embodiment basically has similar functions to those of the embodiment, the configuration of the human interface as shown in FIG. 8 is slightly different, and an evaluation mode plus button 67A and an evaluation mode minus button 67B for the user to consciously evaluate a tune by hand are provided, so that the user has a function of evaluating a tune consciously.

Next, the operation of the present embodiment is described. In this case, a tune in the HDD 8 is replayed from the content list and at the point when the user listens to the tune and judges that the user does not like it, the user presses the minus button 67B. When the user likes it, the user presses the plus button 67A. Although it may be considered that these buttons are provided with grade by the number of presses and the intensity of the press, in the present embodiment, the degree of the preference of the user is measured by a elapsed time from the replay start of a tune to pressing of the plus button 67A or the minus button 67B.

Accordingly, in this case, the control section 10 also measures the elapsed time from the start of replay of the tune to the pressing of the plus button 67A or the minus button 67B. By sending this elapsed time to the CPU 2, the CPU 2 refers to a block diagram as shown in FIG. 9 to automatically evaluate the degree of the preference of the user in the graded manner and to register it in the preference information recording area of the HDD 8.

Here, if the elapsed time is T and a certain constant number is S (for example 20), in the case where the plus button 67A is pressed, S/T is added as points, and in the case where the minus button 67B is pressed, S/T is subtracted as points. In the division, cutoff or rounding off of a fractional portion or quantization is performed. In FIG. 9, in the case where the evaluation mode plus button 67A is pressed, if the elapsed time is T second(s) within two seconds, the CPU 2 assumes that the user judged the tune to be matched with the user's preference at once, and registers the evaluation value of 10 as the evaluation value of the tune in the preference information registration area in association with the title of there played tune. In the case where the elapsed time is T seconds within five seconds, the CPU 2 assumes that the user judged the tune to be matched with the preference at once, and registers the evaluation value of 20/T as the evaluation value of the tune in the preference information registration area in association with the title of the replayed tune. In the case where the elapsed time is T seconds within 30 seconds, the CPU 2 assumes that the user judged the tune to be matched with the preference after listening for a while, and registers the evaluation value of 20/T as the evaluation value of the tune in the preference information registration area in association with the title of the replayed tune.

Next, in the case where the evaluation mode minus button 67B is pressed, if the elapsed time is T second(s) within two seconds, the CPU 2 assumes that the user judged the tune to be unmatched with the user's preference at once, and registers an evaluation value of −10 as the evaluation value of the tune in the reference information registration area in association with the title of the replayed tune. In the case where the elapsed time is T seconds within five seconds, the CPU 2 assumes that the user judged the tune to be unmatched with the user's preference at once, and registers an evaluation value of −20/T as the evaluation value of the tune in the reference information registration area in association with the title of there played tune. In the case where the elapsed time is T seconds within 30 seconds, the CPU 2 assumes that the user judged the tune to be unmatched with the user's preference after listening for a while, and registers an evaluation value of −20/T as the evaluation value of the tune in the preference information registration area in association with the title of there played tune.

The preference of the user may be developed because the understanding is deepened by listening to the tune a plurality of times, or the user grows tired because the user listens to it too many times. Accordingly, as the evaluation mode is performed more times, the precision of the obtained preference information is increased.

According to the present embodiment, as compared with the case where the user inputs evaluation points indicating the degree of the user's preference for each content, since the CPU 2 automatically gives evaluation points, simple, quick evaluation may be performed and at the same time, detailed evaluation values may be obtained, so that the precision of the obtained preference information may be improved. In particular, in this case, since the intentional evaluation of the user is included, the precision of the created preference information is improved more than that of the embodiment.

The present invention is not limited to the above-mentioned embodiments, but can be carried out by other various embodiments in concrete configuration, function, action and effect within a range not departing from its gist. Although the evaluation methods described in the above-mentioned embodiments are preferably applied to music contents because the unit of one tune is well-defined as a content, by similarly applying the present invention to a movie, television program, still image, text, game or the like, similar effects can be obtained.

Furthermore, since some of contents such as the music described in the above-mentioned embodiments each have a special introduction part which does not represent the impression of the whole tune, by using a preview version in which representative parts are selected for the music provided in the evaluation mode, a more precise evaluation value can be obtained.

Furthermore, by providing in the device as shown in FIG. 1 a network interface connecting to the communication network such as the internet, a content matched with a preference analogized from the preference information may be automatically downloaded from the communication network to be stored. At this time, a demo version (to listen or watch as a trial) for selecting the content matched with the preference or the beginnings of contents may be downloaded.

Furthermore, by providing in the device as shown in FIG. 1 a receiver capable of receiving a broadcasting radio wave, the content, which is matched with the preference, such as an audio or video content may be recorded. In this case, if the preference of the user to the broadcasting content is evaluated from a staying time in a channel by zapping during broadcast reception, a similar effect may be obtained. This is because the user changes to another channel at once if the user does not like the program.

Furthermore, the above-mentioned evaluation methods can be combined with a scoring method in which the user uniquely determines the evaluation or be used in combination with a procedure in which the user adds or subtracts points consciously.

What is claimed is:

1. A replay apparatus including a skip function, which is initiated if a skip button is pressed, for stopping a replay operation to restart at a next content after skipping during the replay operation of one of a plurality of stored contents, the replay apparatus comprising:

measuring means for measuring an elapsed time from a replay start time of a content and a time when the content is skipped;

evaluating means for giving an evaluation value reflecting a preference of a user to the replayed content that is skipping based on the elapsed time; and creating means for creating preference information by registering the given evaluation value in association with the replayed content, wherein:

the evaluating means corrects the given evaluation value in accordance with a tempo of the content to be evaluated wherein a correction coefficient is determined so as not to decrease the evaluation value if the elapsed time is extended due to the tempo of the content being slow.

2. The replay apparatus according to claim 1, wherein:
the evaluating means gives a lower evaluation value of the preference to the replayed content if the elapsed time is smaller.

3. The replay apparatus according to claim 1, wherein:
the evaluating means gives no evaluation value or an evaluation value of 0 to the replayed content if the elapsed time is less than a threshold value.

4. The replay apparatus according to claim 1, wherein:
the evaluating means corrects the given evaluation value in accordance with a feature of the content to be evaluated.

5. The replay apparatus according to claim 1, wherein:
the evaluating means obtains an evaluation value in response to the measured elapsed time with reference to reference data including a list of evaluation values corresponding elapsed times or calculation methods for evaluation values.

6. The replay apparatus according to claim 1, wherein:
the evaluating means defines a time when a beginning of a substantial part of the content is replayed as a replay start time of the content.

7. The replay apparatus according to claim 1, further comprising:
selecting means for selecting a plurality of contents, which are more preferred by a user, among a large number of stored contents based on the created preference information; and
replaying means for replaying the plurality of selected contents sequentially.

8. The replay apparatus according to claim 1, further comprising:
inferring means for inferring a content that is preferred by a user based on the preference information; and
content acquiring means for downloading and storing the inferred content from a communication network.

9. A replay apparatus replaying a content selected from a plurality of stored contents, the replay apparatus comprising:
acquiring means for acquiring operation information for replaying a content and replaying status;
evaluating means for giving an evaluation value reflecting a preference of a user to a replayed content based on the acquired operation information and the replaying status; and
creation means for creating preference information by registering the given evaluation value in association with the replayed content, wherein:
the evaluating means corrects the given evaluation value in accordance with a tempo of the content to be evaluated wherein a correction coefficient is determined so as not to decrease the evaluation value if the elapsed time is extended due to the tempo of the content being slow.

10. The replay apparatus according to claim 9, wherein:
the evaluating means gives an evaluation value indicating of a higher preference to a content which is replayed to the end and consecutively replayed again.

11. The replay apparatus according to claim 9, wherein:
the evaluating means gives an evaluation value indicating of lower preference to a content if replay frequency of the content exceeds a threshold value.

12. The replay apparatus according to claim 9, wherein:
the evaluating means gives an evaluation value indicating of a higher preference to a content if a newly stored content is replayed for the first time.

13. The replay apparatus according to claim 9, wherein:
the evaluating means gives an evaluation value indicating of a lower preference to a content if the content is replayed after a preset period of time has elapsed since the first replay.

14. A replay apparatus replaying a plurality of stored contents sequentially and including an evaluation button manually providing preference to respective contents, the replay apparatus comprising:
measuring means for measuring an elapsed time from a replay start time of a content to a time when the evaluation button is pressed; and
evaluating means for giving an evaluation value reflecting preference of a user to the replayed content based on the elapsed time, wherein:
the evaluating means corrects the given evaluation value in accordance with a tempo of the content to be evaluated wherein a correction coefficient is determined so as not to decrease the evaluation value if the elapsed time is extended due to the tempo of the content being slow.

15. The replay apparatus according to claim 14, wherein:
the evaluation button includes a first button to be used for giving an evaluation indicating the content is matched with a user's preference and a second button to be used for giving an evaluation indicating the content is not matched with a user's preference; and
the evaluating means gives an evaluation value indicating a degree of preference of a user to the replayed content based on the elapsed time if the first button is pressed, and gives an evaluation value indicating a degree of nonpreference of a user to the replayed content based on the elapsed time if the second button is pressed.

16. The replay apparatus according to claim 14, wherein:
a demo version of a content, which is created by editing representative parts of the content, is used as a content to be evaluated.

17. The replay apparatus according to claim 14, wherein:
the evaluating means corrects the given evaluation value in accordance with a feature of the content to be evaluated.

18. A content evaluation method for evaluating a replayed content based on a preference of a user, the content evaluation method comprising:
measuring an elapsed time between times when a plurality of operations associated with the replay of a content are carried out at a replay apparatus;
giving an evaluation value indicating a degree of preference of a user to the replayed content based on the measured elapsed time at the replay apparatus; and
correcting the evaluation value in accordance with a tempo of the content to be evaluated, comprising determining a correction coefficient so as not to decrease the evaluation value if the elapsed time is extended due to the tempo of the content being slow.

19. The content evaluation method according to claim 18, further comprising:
creating preference information by registering the given evaluation value in association with the replayed content.

20. A replay apparatus including a skip function, which is initiated if a skip button is pressed, for stopping a replay operation to restart at a next content after skipping during the replay operation of one of a plurality of stored contents, the replay apparatus comprising:
a measuring section for measuring an elapsed time from a replay start time of a content and a time when the content is skipped;

an evaluating section for giving an evaluation value reflecting a preference of a user to the replayed content that is skipping based on the elapsed time, and for correcting the evaluation value in accordance with a tempo of the content to be evaluated wherein a correction coefficient is determined so as not to decrease the evaluation value if the elapsed time is extended due to the tempo of the content being slow; and a creating section for creating preference information by registering the given evaluation value in association with the replayed content.

21. A replay apparatus replaying a content selected from a plurality of stored contents, the replay apparatus comprising:

an acquiring section for acquiring operation information for replaying a content and replaying status;

an evaluating section for giving an evaluation value reflecting a reference of a user to a replayed content based on the acquired operation information and the replaying status, and for correcting the evaluation value in accordance with a tempo of the content to be evaluated wherein a correction coefficient is determined so as not to decrease the evaluation value if the elapsed time is extended due to the tempo of the content being slow; and a creation section for creating preference information by registering the given evaluation value in association with the replayed content.

22. A replay apparatus replaying a plurality of stored contents sequentially and including an evaluation button manually providing preference to respective contents, the replay apparatus comprising:

a measuring section for measuring an elapsed time from a replay start time of a content to a time when the evaluation button is pressed; and an evaluating section for giving an evaluation value, and for correcting the evaluation value in accordance with a tempo of the content to be evaluated wherein a correction coefficient is determined so as not to decrease the evaluation value if the elapsed time is extended due to the tempo of the content being slow, said corrected evaluation value reflecting preference of a user to the replayed content based on the elapsed time.

* * * * *